US006546467B2

(12) United States Patent
Farrall et al.

(10) Patent No.: US 6,546,467 B2
(45) Date of Patent: Apr. 8, 2003

(54) CACHE COHERENCY MECHANISM USING AN OPERATION TO BE EXECUTED ON THE CONTENTS OF A LOCATION IN A CACHE SPECIFYING AN ADDRESS IN MAIN MEMORY

(75) Inventors: Glenn Farrall, Long Ashton (GB); Bruno Fel, Sassenage (FR); Catherine Barnaby, Coalpit Heath (GB)

(73) Assignee: SGS-Thomson Microelectronics Limited, Almondsbury Bristol (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,134

(22) Filed: Mar. 2, 1998

(65) Prior Publication Data

US 2002/0007442 A1 Jan. 17, 2002

(30) Foreign Application Priority Data

Mar. 5, 1997 (GB) .............................................. 9704542

(51) Int. Cl.[7] .............................................. G06F 12/08
(52) U.S. Cl. ...................... 711/146; 711/202; 711/123; 711/141
(58) Field of Search ................................ 711/135, 129, 711/141, 143, 144, 118, 146, 120, 202, 122, 123

(56) References Cited

U.S. PATENT DOCUMENTS

| 4,713,755 | A | * | 12/1987 | Worley, Jr. et al. | ......... 711/144 |
|---|---|---|---|---|---|
| 5,029,070 | A | * | 7/1991 | McCarthy et al. | ........... 711/143 |
| 5,091,846 | A | * | 2/1992 | Sachs et al. | ................. 711/130 |
| 5,515,522 | A | * | 5/1996 | Bridges et al. | .............. 711/141 |
| 5,579,503 | A | * | 11/1996 | Osborne | ...................... 711/119 |
| 5,586,297 | A | * | 12/1996 | Bryg et al. | ................. 711/143 |
| 5,907,853 | A | * | 5/1999 | Jacobs et al. | ................ 711/146 |
| 6,122,711 | A | * | 9/2000 | Mackenthun et al. | ........ 711/135 |
| 6,128,706 | A | * | 10/2000 | Bryg et al. | ................. 711/141 |
| 6,351,790 | B1 | * | 2/2002 | Jones | ......................... 711/133 |
| 6,412,043 | B1 | * | 6/2002 | Chopra et al. | .............. 711/118 |
| 2002/0083269 | A1 | * | 6/2002 | Sturges et al. | .............. 711/129 |

FOREIGN PATENT DOCUMENTS

| EP | 0 210 384 | 2/1987 | .......... G06F/12/08 |
| EP | 0 220 451 | 5/1987 | .......... G06F/12/08 |

OTHER PUBLICATIONS

Standard Search Report performed on Oct. 20, 1997, for RS 99565.
*Multiprocessing Aspects of the Power PC™ 601*, Allen et al., IEEE, Feb. 1993, pp 117–126.

* cited by examiner

Primary Examiner—Matthew Kim
Assistant Examiner—Pierre-Michel Bataille
(74) Attorney, Agent, or Firm—Wolf, Greenfield & Sacks, P.C.; James H. Morris; Robert A. Skrivanek, Jr.

(57) ABSTRACT

A computer system has a processor, a cache and a main memory. A cache coherency mechanism ensures that the contents of the cache are coherent with respect to main memory by the provision of cache coherency instructions which each specify: 1) an operation to be executed on the contents of a location in the cache; and 2) an address in main memory. The operation is executed for the contents of the location in the cache which could be filled by an access to that address in main memory if the executing process normally has access to that address in main memory, regardless of whether or not the contents of the specified address in main memory are held at that location in the cache. This provides an extra degree of freedom because it is not necessary for the cache coherency operation to be requested in respect of a particular address stored in the cache. The instruction can specify any address which would map onto that cache location.

20 Claims, 4 Drawing Sheets

CACHE COHERENCY MECHANISM USING AN OPERATION TO BE EXECUTED ON THE CONTENTS OF A LOCATION IN A CACHE SPECIFYING AN ADDRESS IN MAIN MEMORY

FIELD OF THE INVENTION

The present invention relates to a cache coherency mechanism.

BACKGROUND OF THE INVENTION

As is well known in the art, cache memories are used in computer systems to decrease the access latency to certain data and code and to decrease the memory bandwidth used for that data and code. A cache memory can delay, aggregate and reorder memory accesses.

A cache memory operates between a processor and a main memory of a computer. Data and/or instructions which are required by the process running on the processor can be held in the cache while that process runs. An access to the cache is normally much quicker than an access to main memory. If the processor does not locate a required data item or instruction item in the cache memory, it directly accesses main memory to retrieve it, and the requested data or instruction item is loaded into the cache. There are various known systems for using and refilling cache memories.

In order to rely on a cache in a real time system, the behaviour of the cache needs to be predictable. That is, there needs to be a reasonable degree of certainty that particular data items or instructions which are expected to be found in the cache will in fact be found there. Most existing refill mechanisms will normally always attempt to place in the cache a requested data item or instructions. In order to do this, they must delete other data items or instructions from the cache. This can result in items being deleted which were expected to be there for later use. This is particularly the case for a multi-tasking processor, or for a processor which has to handle interrupt processes or other unpredictable processes.

A computer system may have more than one processor, and each processor may have its own cache. Alternatively, a processor may have a plurality of CPUs, each with its own cache. However, these caches will commonly access a single main memory resource.

FIG. 7 illustrates a case where there are two processors CPU1, CPU2 each with their own cache CACHE1, CACHE2. The caches share a single memory resource MEM. FIG. 8 shows what can happen in such a situation. Consider an address in main memory 1010. This maps onto cache location 10 in both CACHE1 and CACHE2. The value $V_3$ stored at address 1010 had an initial value of X, and the value $V_3=X$ was initially stored at cache location 10 in both of the caches. At that stage, the data item $V_3$ was "visible", that is either processor accessing address 1010 would retrieve from its cache the value $V_3=X$. However, the CPU1 has executed a process, modified the value $V_3=Y$ and returned this to the location 10 in CACHE1. Now, the value $V_3=X$ in main memory is "dirty"—it no longer reflects the current value of $V_3$. Moreover, the value $V_3=X$ in CACHE2 is "stale"—it differs from the true value. Clearly, this situation needs to be rectified before CPU2 attempts to retrieve $V_3$, because otherwise it will wrongly retrieve $V_3=X$.

Thus cache coherency control is required to ensure that several processors and devices can correctly share memory. This can be achieved by:

1. Automatic coherency. Additional hardware guarantees that loads can retrieve the most recently written value regardless of which processor or device wrote it. Note that a functional, but low performance, implementation of automatic coherency is to disable the cache. Such additional hardware is referenced COHERE in FIG. 7.

2. Software coherency. Special code sequences are used in the program to control the transfer of data between cache and memory. They allow precise control of coherency and efficient use of the cache.

The visibility of data depends on whether the cache is automatically coherent or not. If the cache is not automatically coherent then only the contents of memory and its own cache are visible to a processor. Software has to cooperate to ensure that data is written to memory when appropriate. If the cache is automatically coherent then the most recently written value by any processor will be visible to all other processors.

Visibility definitions.

Visible A data item is visible to a processor if a load from the data item's address will return that item.

Stale A data item is stale if the value in the cache is different from the last value written.

Dirty A data item is dirty if it has been modified in the cache with respect to main memory.

In a situation where a process wishes to clear a location in the cache, but the process does not have access to the address stored at that cache location, existing software coherency techniques require usage of a special, privileged mode of processor operation termed kernel mode. In a normal user mode it is not possible in such a circumstance to render the cache coherent using software coherency techniques other than by transfer into kernel mode.

SUMMARY OF THE INVENTION

According to one aspect of the present invention there is provided a cache coherency mechanism in a computer system comprising a processor, a cache and main memory wherein a plurality of addresses in main memory have access to each location in the cache, wherein a process being run by the processor includes a cache coherency instruction which specifies (i) an operation to be executed on the contents of a location in the cache and (ii) an address in main memory, the operation being executed for the contents of the location in the cache which would be filled by an access to said address in main memory, if the running process normally has access to said address in main memory, regardless of whether or not the contents of the specified address in main memory are held at that location in the cache.

The contents of each cache location can comprise an address in memory and an item stored at that address in main memory. The whole or part of the address in main memory can be held. The item may be a data item or an instruction.

The cache coherency mechanism defined above has the advantage that it is not necessary to request the cache coherency operation to be executed on a particular address stored in the cache. The instruction can specify any address which would map onto that cache location, and the processor can execute the instruction if it would normally have access to that address. Thus, any protection modes are automatically taken into account because, if the executing process does not have access to the specified address in main memory of the cache coherency instruction, the cache coherency operation will not be executed.

One type of cache coherency instruction is a flush instruction which writes back to the address in main memory held at that cache location, the item held at the cache location.

Another type of cache coherency instruction is a purge instruction which clears the contents of that cache location.

The cache coherency instruction can specify a sequence of addresses in main memory and operate for the contents of a set of locations in the cache which would normally be filled by accesses to the addresses in the sequence. Alternatively, a sequence of cache coherency instructions can be executed, each specifying one address in main memory.

The cache can be partitioned into a plurality of cache partitions, wherein the cache partition containing the relevant location in the cache is determined in dependence on the specified address in main memory. More details of a particular cache partitioning implementation may be obtained from our earlier Application No. 09/014,194, now U.S. Pat. No. 6,295,580.

The main memory can be organised in pages, each page comprising a sequence of addresses. In that case, the cache coherency instruction can specify a page in main memory for which the operation is to be executed, the operation being executed for each of the sequence of addresses in the specified page.

In that case, if the number of addresses in each page is always greater than the number of locations in one of the cache partitions, it can be determined that a cache partition can always be fully cleared by specifying a page.

The cache, or each cache partition, can be direct mapped. However, other associativities are possible.

The invention also provides a computer system comprising:
  a processor for running a process by executing a sequence of instructions;
  a main memory which holds said instructions and data for said instructions; and
  a cache connected in a memory access path between the processor and the main memory and having a plurality of storage locations, wherein a plurality of addresses in the main memory have access to each storage location, wherein the sequence of instructions for execution by the processor includes a cache coherency instruction which specifies (i) an operation to be executed on the contents of a storage location in the cache and (ii) an address in the main memory, wherein the specified operation is executed for the contents of the storage location in the cache which could be filled by an access to said specified address in main memory, if the running process normally has access to said address in main memory, regardless of whether or not the contents of the specified address in main memory are held at that location in the cache.

The invention further provides a method of modifying the coherency status of the contents of a cache with respect to items held in a main memory, wherein a plurality of addresses in main memory have access to each location of the cache, the method comprising:
  executing a cache coherency instruction which specifies (i) an operation to be executed on the contents of a location in the cache and (ii) an address in main memory;
  responsive to said cache coherency instruction, executing the specified operation for the contents of the location in the cache which could be filled by an access to said address in main memory, if the running process normally has access to said address in main memory, regardless of whether or not the contents of the specified address in main memory are held at that location in the cache.

The invention further provides an instruction set for a computer system which includes a cache coherency instruction which specifies (i) an operation to be executed on the contents of a location in a cache and (ii) an address in main memory, the cache coherency instruction causing the specified operation to be executed for the contents of the location in the cache which could be filled by an access to said address in main memory, only if the running process normally has access to said address in main memory, regardless of whether or not the contents of the specified address in main memory are held at that location in the cache.

In the preferred embodiment, the processor has a user mode of operation and a privileged (kernel) mode of operation. Cache coherency instructions are executable in the user mode.

For a better understanding of the present invention and to show how the same may be carried into effect, reference will now be made by way of example to the accompanying drawings.

DESCRIPTION OF THE PREFERRED EMBODIMENT

Prior to describing a cache coherency mechanism, there will first be described a cache architecture within which the mechanism can be implemented.

Figure 1:
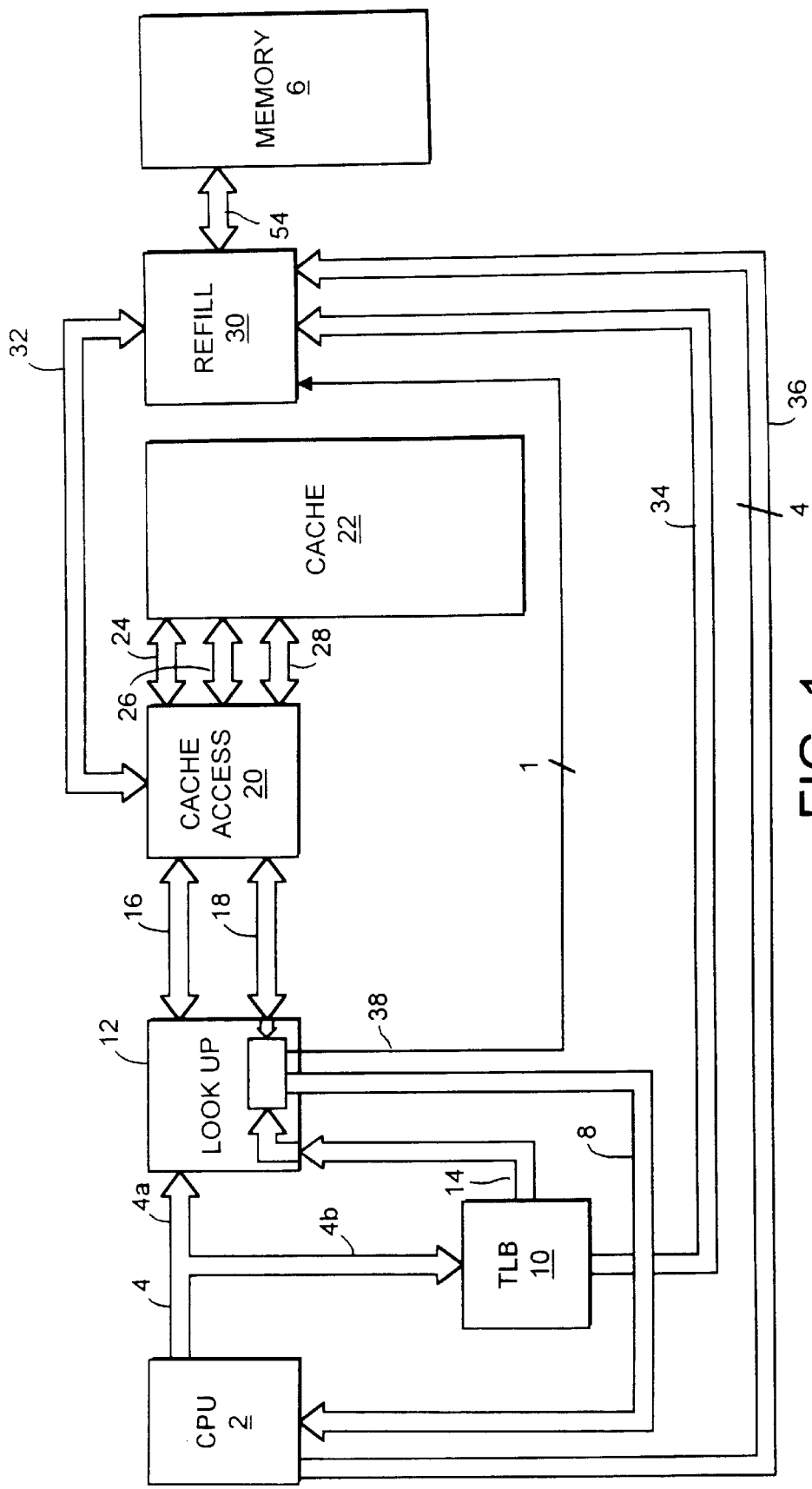
FIG. 1 is a block diagram of a computer incorporating a cache system.

FIG. 1 is a block diagram of a computer incorporating a cache system. The computer comprises a CPU2 which is connected to an address bus 4 for accessing items from a main memory 6 and to a data bus 8 for returning items to the CPU2. Although the data bus 8 is referred to herein as a data bus, it will be appreciated that this is for the return of items from the main memory 6, whether or not they constitute actual data or instructions for execution by the CPU. The system described herein is suitable for use on both instruction and data caches. As is known, there may be separate data and instruction caches, or the data and instruction cache may be combined. In the computer described herein, the addressing scheme is a so-called virtual addressing scheme. The address is split into a line in page address 4a and a virtual page address 4b. The virtual page address 4b is supplied to a translation look-aside buffer (TLB) 10. The line in page address 4a is supplied to a look-up circuit 12. The translation look-aside buffer 10 supplies a real page address 14 converted from the virtual page address 4b to the look-up circuit 12. The look-up circuit 12 is connected via address and data buses 16,18 to a cache access circuit 20. Again, the data bus 18 can be for data items or instructions from the main memory 6. The cache access circuit 20 is connected to a cache memory 22 via an address bus 24, a data bus 26 and a control bus 28 which transfers replacement information for the cache memory 22. A refill engine 30 is connected to the cache access circuit 20 via a refill bus 32 which transfers replacement information, data items (or instructions) and addresses between the refill engine and the cache access circuit. The refill engine 30 is itself connected to the main memory 6.

The refill engine 30 receives from the translation look-aside buffer 10 a full real address 34, comprising the real page address and line in page address of an item in the main memory 6. The refill engine 30 also receives a partition indicator from the translation look-aside buffer 10 on a four bit bus 36. The function of the partition indicator will be described hereinafter.

Finally, the refill engine 30 receives a miss signal on line 38 which is generated in the look-up circuit 12 in a manner which will be described more clearly hereinafter.

The cache memory 22 described herein is a direct mapped cache. That is, it has a plurality of addressable storage locations, each location constituting one row of the cache. Each row contains an item from main memory and part of the address in main memory of that item. Each row is addressable by a row address which is constituted by a number of bits representing the least significant bits of the address in main memory of the data items stored at that row. For example, for a cache memory having eight rows, each row address would be three bits long to uniquely identify those rows. For example, the second row in the cache has a row address 001 and thus could hold any data items from main memory having an address in the main memory which ends in the bits 001. Clearly, in the main memory, there would be many such addresses and thus potentially many data items to be held at that row in the cache memory. Of course, the cache memory can hold only one data item at that row at any one time.

Operation of the computer system illustrated in FIG. 1 will now be described but as though the partition indicator was not present. The CPU2 requests an item from main memory 6 using the address in main memory and transmits that address on address bus 4. The virtual page number is supplied to the translation look-aside buffer 10 which translates it into a real page number 14 according to a predetermined virtual to real page translation algorithm. The real page number 14 is supplied to the look-up circuit 12 together with the line in page number 4a of the original address transmitted by the CPU 2. The line in page address is used by the cache access circuit 20 to address the cache memory 22. The line in page address includes a set of least significant bits (not necessarily including the end bits) of the main address in memory which are equivalent to the row address in the cache memory 22. The contents of the cache memory 22 at the row address identified by the line in page address, being a data item (or instruction) and the address in main memory of the data item (or instruction), are supplied to the look-up circuit 12. There, the real page number of the address which has been retrieved from the cache memory is compared with the real page number which has been supplied from the translation look-aside buffer 10. If these addresses match, the look-up circuit indicates a hit which causes the data item which was held at that row of the cache memory to be returned to the CPU along data bus 8. If however the real page number of the address which was held at the addressed row in the cache memory 22 does not match the real page number supplied from the translation look-aside buffer 10, then a miss signal is generated on line 38 to the refill engine 30. It is the task of the refill engine 30 to retrieve the correct item from the main memory 6, using the real address which is supplied from the translation look-aside buffer 10 on bus 34. The data item, once fetched from main memory 6 is supplied to the cache access circuit 20 via the refill bus 32 and is loaded into the cache memory 22 together with the address in main memory. The data item itself is also returned to the CPU along data bus 8 so that the CPU can continue to execute. In a direct mapped cache memory as outlined above, it will be apparent that the data item and its address recalled from the main memory 6 will be loaded into the storage location from which the data item was originally accessed for checking. That is, it will be over-written into the only location which can accept it, having a row address matching the set of least significant bits in the line in page address in main memory. Of course, the page number of the data item originally stored in the cache memory and the data item which is now to be loaded into it are different. This "one to one mapping" limits the usefulness of the cache.

Figure 2:
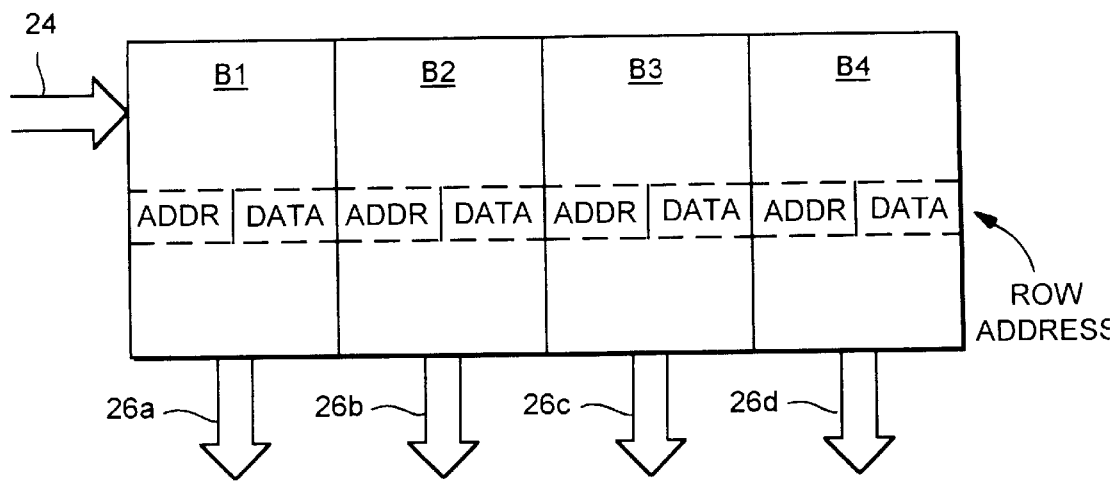
FIG. 2 is a sketch illustrating a four way set associative cache.

To provide a cache system with greater flexibility, an n-way set associative cache memory has been developed. An example of a 4-way set associative cache is illustrated in FIG. 2. The cache memory is divided into four banks B1,B2,B3,B4. The banks can be commonly addressed row-wise by a common row address, as illustrated schematically for one row in FIG. 2. However, that row contains four cache entries, one for each bank. The cache entry for bank B1 is output on bus 26a, the cache entry for bank B2 is output on bus 26b, and so on for banks B3 and B4. Thus, this allows four cache entries for one row address (or line in page address). Each time a row is addressed, four cache entries are output and the real page numbers of their addresses are compared with the real page number supplied from the translation look-aside buffer 10 to determine which entry is the correct one. If there is a cache miss upon an attempted access to the cache, the refill engine 30 retrieves the requested item from the main memory 6 and loads it into the correct row in one of the banks, in accordance with a refill algorithm which is based on, for example, how long a particular item has been held in the cache, or other program parameters of the system. Such replacement algorithms are known and are not described further herein.

Nevertheless, the n-way set associative cache (where n is the number of banks and is equal to four in FIG. 2), while being an improvement on a single direct mapped system is still inflexible and, more importantly, does not allow the behaviour of the cache to be properly predictable.

The system described herein provides a cache partitioning mechanism which allows the optimisation of the computer's use of the cache memory by a more flexible cache refill system.

Figure 3:
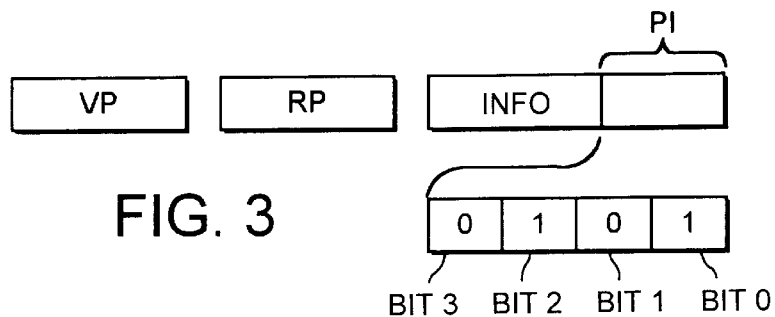
FIG. 3 is an example of an entry in a translation look aside buffer.

In the translation look-aside buffer 10 in the system described herein, each TLB entry has associated with the virtual page number, a real page number and an information sequence. An example entry is shown in FIG. 3, where VP represents the virtual page number, RP represents the real page number and INFO represents the information sequence. The information sequence contains various information about the address in memory in a manner which is known and which will not be described further herein. However, according to the presently described system the information sequence additionally contains a partition indicator PI, which in the described embodiment is four bits long. Thus, bits 0 to 3 of the information sequence INFO constitute the partition indicator. The partition indicator gives information regarding the partition into which the data item may be placed when it is first loaded into the cache memory 22. For the cache structure illustrated in FIG. 2, each partition can constitute one bank of the cache. In the partition indicator, each bit refers to one of the banks. The value of 1 in bit j of the partition indicator means that the data in that page may not be placed in partition j. The value of 0 in bit j means that the data in that page may be placed in partition j. Data may be placed in more than one partition by having a 0 in more than one bit of the partition indicator. A partition indicator which is all zeros allows the data to be placed in any partition of the cache. A partition indicator which is all ones does not allow any data items to be loaded into the cache memory. This could be used for example for "freezing" the contents of the cache, for example for diagnostic purposes.

In the example given in FIG. 3, the partition indicator indicates that replacement of data items which have that real page number in main memory may not use banks B1 or B3 but may use banks B2 or B4.

It is quite possible to allocate more than one bank to a page. In that case, if the line in page address has more bits than the row address for the cache, the partitions would behave as a k-way set associative cache, where k partitions are allocated to a page. Thus, in the described example the real page number of FIG. 3 can use banks B2 and B4. However, it may not use banks B1 and B3.

The partition information is not used on cache look-up, but only upon cache replacement or refill. Thus, the cache access can locate data items held anywhere in the cache memory, whereas a replacement will only replace data into the allowed partitions for that page address.

Figure 4:
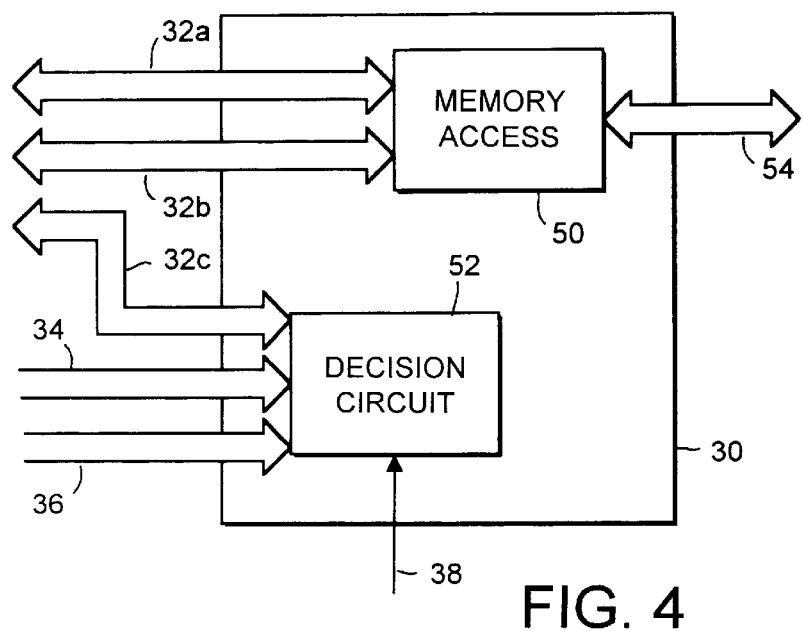
FIG. 4 is a block diagram of the refill engine.

FIG. 4 illustrates in more detail the content of the refill engine 30. The refill bus 32 is shown in FIG. 4 as three separate buses, a data bus 32a, an address bus 32b and a bus 32c carrying replacement information. The address and data buses 32b and 32a are supplied to a memory access circuit 50 which accesses the main memory via the memory bus 54. The replacement information is fed to a decision circuit 52 which also receives the real address 34, the partition indicator PI on bus 36 and the miss signal 38. The decision circuit 52 determines the proper partition of the cache into which data accessed from the main memory is to be located.

The partition indicator PI can be set in the TLB like any other TLB entry. In the described example, the partition indicators are set by kernel mode software running on the CPU 2 and it is the responsibility of that kernel mode software to ensure that pages which should not be placed in a particular cache partition do not have their partition indicator bits set for that partition. However, a user may alter partitions by requesting that the cache partitions be altered. In that event, the CPU 2 would change to kernel mode to implement the request, change the TLB entries accordingly and then return to the user mode to allow the user to continue. Thus, a user can alter the partitioning behaviour of the cache, thus providing much greater flexibility than has hitherto been possible.

Figure 5:
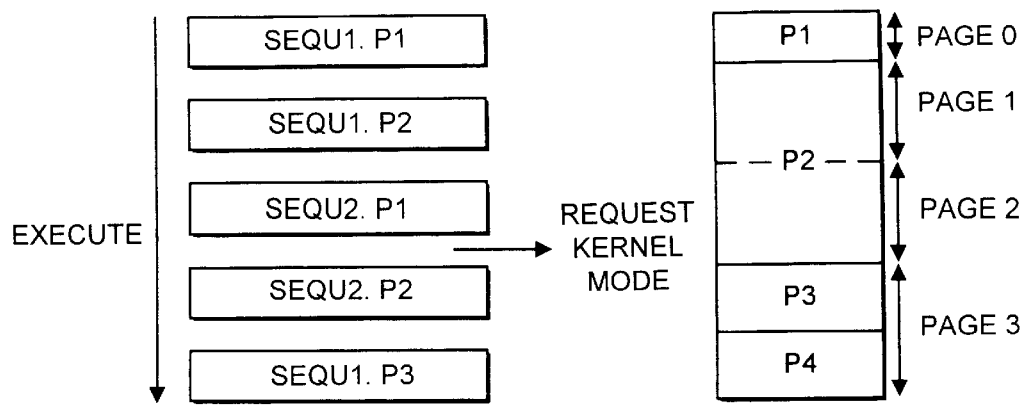
FIG. 5 is a diagram illustrating the operation of a multi-tasking processor.

The cache partitioning mechanism described herein is particularly useful for a multi-tasking CPU. A multi-tasking processor is capable of running more than one process "simultaneously". In practice, the processor executes part of a process and, when that process is halted for some reason, perhaps in need of data or a stimulus to proceed, the processor immediately begins executing another process. Thus, the processor is always operating even when individual processes may be held up waiting for data or another stimulus to proceed. FIG. 5 illustrates diagrammatically such a situation. On the left hand side of FIG. 5 is illustrated the sequence which a processor may undertake to run different processes P1,P2,P3,P4. On the right hand side of FIG. 5 is an illustration of where these processes may expect their data to be held in memory. Thus, the data for the process P1 are held on page 0. The data for process P2 are held on pages 1 and 2. Data for processes P3 and P4 share page 3. In the example, the processor executes a first sequence of process P1, a first sequence of process P2, a second sequence of process P1, a second sequence of process P2 and then a first sequence of process P3. When the second sequence of the process P1 has been executed, the process P1 has been fully run by the processor. It will readily be apparent that in a conventional cache system, once the processor has started executing the first sequence of the process P2, and is thus requesting accesses from page 1, the data items and instructions in these lines will replace in the cache the previously stored data items and instructions from page 0. However, these may soon again be required when the second sequence of the process P1 is executed.

Figure 6:
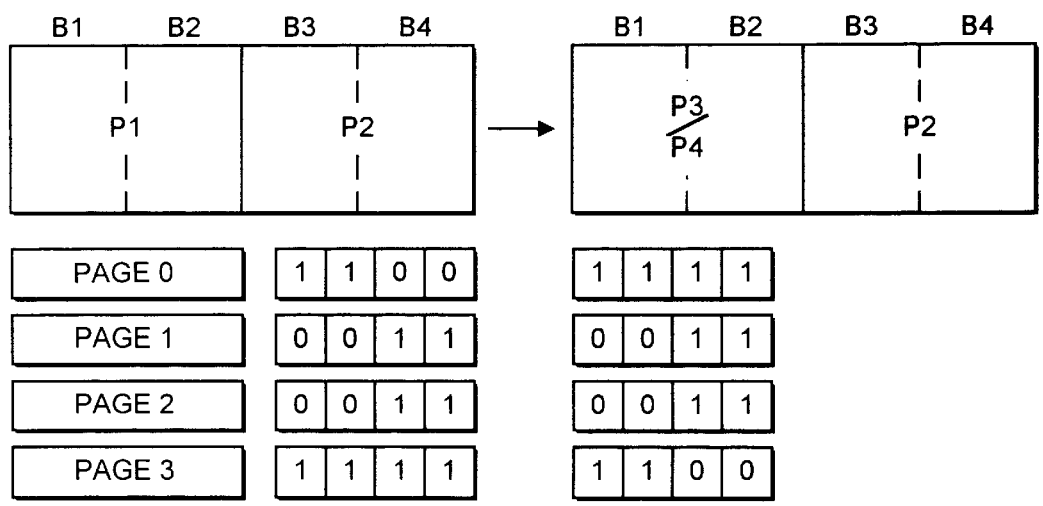
FIG. 6 is a diagram illustrating the alteration in caching behaviour for the system of FIG. 5.
Figure 7:
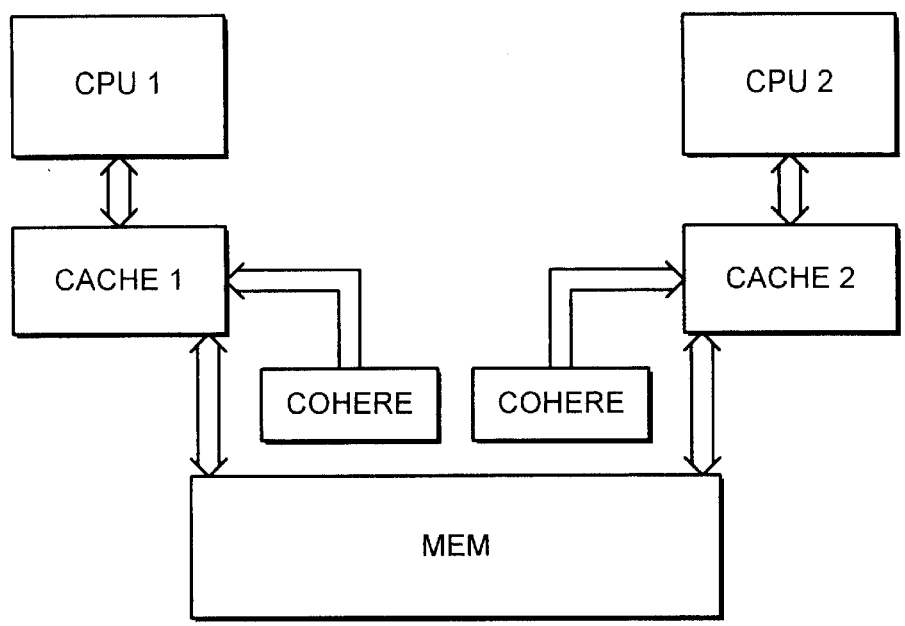
FIG. 7 is a block diagram of automatic coherency control.

The cache partitioning mechanism described herein avoids the timing delays and uncertainties which can result from this. FIG. 6 shows the partitioning of the cache while the processor is running process P1, and the change in the partitioning when the processor switches to running P3 etc. FIG. 6 also shows the TLB cache partition indicators for each case. Thus, on the left hand side FIG. 6 shows the cache partitioned while the processor is running processes P1 and P2. The process P1 may use banks B1 and B2 of the cache, but may not use banks B3 and B4. Conversely, the process P2 may use banks B3 and B4, but not banks B1 and B2. This can be seen in the TLB entries below. This is, page 0 has a cache partition indicator allowing it to access banks B1 and B2, but not B3 and B4. Pages 1 and 2 have cache partition indicators allowing them to access banks B3 and B4 but not B1 and B2. Page 3 has a cache partition indicator which prevents it from accessing the cache. Thus, any attempt by the processor to load data items from the process P3 into the cache would be prohibited. For the described process sequence, this however is not a disadvantage because, as can be seen, the processor is not intending to execute any part of the process P3 until it has finished executing process P1. If it did for some reason have to execute P3, the only downside would be that it would have to make its accesses from direct memory and would not be allowed use of the cache.

When the process P1 has finished executing, the processor can request kernel mode to allow it to alter the cache partition indicators in the TLB. In the described embodiment, kernel processes do not have access to the cache. Instead they modify the TLB entries for the partition indicators to modify the behaviour of the cache. The change is illustrated on the right hand side of FIG. 6. Thus, now the cache partition indicators prevent the process P1 from using the cache at all, but allocate banks B1 and B2 to the processes P3 and P4, by altering the cache partition indicator for page 3 so that it can access these banks of the cache. Thus, when the processor is expecting to execute the process P3, it now has a cache facility.

Some possible variations on the above described embodiment are mentioned below.

In the described embodiment above, the address issued by the CPU on address bus 4 is split into a virtual page number 4b and a line in page 4a. However, the entire virtual address could be sent from the CPU to the look-up circuit for the cache. Conversely, the CPU could issue real addresses directly to the look-up circuit. What is important is that the cache partition indicator is provided in association with the address in main memory.

In the embodiment described above, a single cache access circuit 20 is shown for accessing the cache both on look-up and refill. However, it is also possible to provide the cache with an additional access port for refill, so that look-up and refill take place via different access ports for the cache memory 22.

In the described embodiment, the refill engine 30 and cache access circuit 20 are shown in individual blocks. However, it would be quite possible to combine their functions into a single cache access circuit which performs both look-up and refill.

Figure 8:
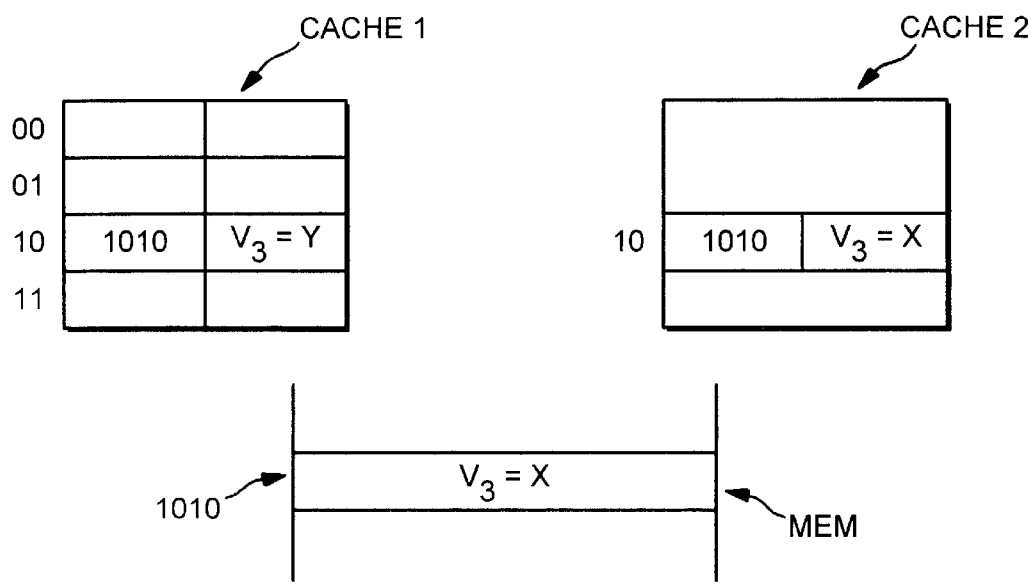
FIG. 8 illustrates "stale" and "dirty" data items.

As can be seen in FIGS. 2 and 8, each location in the cache holds an address in main memory and the item (data or instruction) from that address in main memory. It is not necessary for the whole of the memory address to be held at the cache location. For example the most significant bits of the address would generally be held to constitute a tag for that cache entry. This is known in the art and is not described further herein.

A cache coherency mechanism will now be described. The operation types which alter the state of the data and instruction cache are shown in Table 1.

TABLE 1

| Operation Type | Effect | Action |
| --- | --- | --- |
| Flush | Make dirty data visible to other users. | Writes last written value in cache to memory |
| Purge | Remove data from cache. | Clears cache. |
| ICohere | Remove stale data from the instruction cache. | Clears cache. |

Data coherency operations are ordered with respect to loads and stores which access items in memory at addresses in main memory within the range of the operation. For example, a "store" followed by a "flush" to an overlapping part of the address space will ensure that the flush operates on the newly written data. The operations are executed in user mode. A user mode thread must have either read or write permission for the page on which the operation is to be performed.

Each of the coherency operations are provided to operate on both lines and partitions. The line operations are described herein for the sake of completeness although they do not form part of the present invention.

Line Operations

Line operations allow cache control of individual lines. A line is specified by any byte address contained with the line. These instructions are intended to make it easy to construct optimizable loops of instructions which will operate on a given address range. For example, to purge a given buffer from the cache, the purgeline instruction is executed in a loop with the first address operand being the start of the buffer and subsequent addresses being the start address of subsequent cache lines. The loop ends when the address exceeds the end of the buffer. The size of the cache line is defined by the implementation, which for the described embodiment is 32 bytes.

Partition Operations

The partition-based instructions use an address to determine, via the relevant TLB entry, which one of a set of partitions are to be acted upon. The instructions will then operate upon a line within one of these partitions which the address could replace.

The partition-based instructions are intended to be used in a sequence of instructions. The following conditions will perform the operation on the whole partition in which the page containing address could be replaced:

Address is initialised to the address of the first byte in the page.

The partition operation is repeated with the same address once for each partition the data may be able to reside in.

Address is incremented until the offset within the page reaches the partition size. Repeating the partition operations at each increment.

In the described embodiment, the smallest page size is at least as large as the partition size. Therefore using the operations on a single page will operate on the whole partition.

If software uses the address of a byte larger than the partition size within the page, this will map onto a line in the cache which has already been operated upon. Therefore the code will run correctly, but there will be a performance penalty in performing a needless instruction.

The partition-based instructions use the address (and therefore the partition identifier) to identify a set of lines in the cache. One of this set is then acted upon, whether the specified address matches the address in main memory held in the cache or not. Only partitions which have their PI bits clear will be changed by these instructions. That is, the coherency instructions will operate only on those partitions which the running process has access to.

The present cache coherency mechanism provides the following instructions. In these instructions, the denotation dmem refers to the main memory of the computer system.

Flush

These instructions are provided to make certain that dirty data is visible to other users. That is, the item held at the relevant cache location is written back to the address in main memory held at that cache location with the item.

flushline

| flush a line base, offset | unsigned (x) unsigned (x) |
| --- | --- |
| Ensure that all previous writes to the line containing dmem [base+offset] are visible to other users sharing this data. | | flushpart

| flush a partition base, offset | unsigned (x) unsigned (x) |
| --- | --- |
| Flush a dirty cache line which could be replaced by a memory access to dmem [base+offset]. Flushing a line ensures that all previous writes to that line are visible to other users sharing this data. If all replaceable lines are clean the instruction has no effect. | |

Purge [for data items]

These instructions are provided to remove data from the cache—they write back data items in the cache to addresses in main memory specified with those items, then invalidate the cache contents.

purgeline

| purge a line | |
|---|---|
| base, offset | unsigned (x) unsigned (x) |
| Write back to memory any dirty items in the line containing dmem [base+offset] and invalidate the line in all cases | | purgepart

| purge a partition | |
|---|---|
| base, offset | unsigned (x) unsigned (x) |
| Purge a valid cache line which could be replaced by a memory access to dmem [base+offset]. A line is purged by writing to memory any dirty data it contains and then invalidating the line. If all replaceable lines are invalid the instruction has no effect. | |

ICohere [for instructions]

These instructions are provided to make certain that subsequent instruction fetches do not read stale data from the instruction cache.

icohereline

| make coherent a line in the instruction cache | |
|---|---|
| base, offset | unsigned (x) unsigned (x) |
| Invalidate the instruction cache line containing imem [base+offset]. | | icoherepart

| make coherent a partition in the instruction cache | |
|---|---|
| base, offset | unsigned (x) unsigned (x) |
| Invalidate a valid instruction cache line which could be replaced by a memory access to imem [base+offset]. If imem [base+offset] is not cacheable the instruction has no effect. If all replaceable lines are invalid the instruction has no effect. | |

In another embodiment, the partition-based flush instruciton can have the following form. In the following instruction, var<a:b> is bits a to b of the variable var.

flushpart

| flush a partition | |
|---|---|
| base, offset | unsigned (x) unsigned (x) |
| addr←base + offset<br>addrφ<12 : 63>←addr<12 : 63><br>For index=φ, index<4096, index+=32<br>    addrφ<0 : 11>=index<0 : 11><br>Flush a plurality of dirty cache lines which could be replaced by a memory access to dmem [addrφ] | |

The purge and incohere instructions can take a similar form where a single instruction is to operate on a plurality of lines in the cache.

Clearly, the above described instructions are valid for the case where a cache is not partitioned, that is it can be considered that the whole cache is a single partition.

What is claimed is:

1. A cache coherency mechanism in a computer system comprising a processor, a cache and main memory wherein a plurality of addresses in main memory have access to each location in the cache, wherein a process being run by the processor includes a software cache coherency instruction which includes (i) an operation to be executed on the contents of a location in the cache and (ii) an address in main memory;

wherein the cache coherency operation is executed for the contents of said location in the cache to which said address in main memory has access provided that the running process normally has access to said address in main memory and independent of whether the contents of said address in main memory are held at said location in the cache.

2. A cache coherency mechanism according to claim 1, wherein the contents of each cache location comprise a respective address in main memory and an item stored at the respective address in main memory.

3. A cache coherency mechanism according to claim 2, wherein the cache coherency instruction is a flush instruction which writes back to the respective address in main memory the item held at said location in the cache.

4. A cache coherency mechanism according to claim 1, wherein the cache coherency instruction is a purge instruction which clears the contents of said location in the cache.

5. A cache coherency mechanism according to claim 1, wherein the cache coherency instruction includes a sequence of addresses in main memory and operates for the contents of a set of locations in the cache which would normally be filled by accesses to the addresses in said sequence.

6. A cache coherency mechanism according to claim 1, wherein the cache is partitioned into a plurality of cache partitions, and wherein at least one of the cache partitions containing a relevant location in the cache is determined in dependence on said address in main memory.

7. A cache coherency mechanism according to claim 1, wherein the main memory is organised in pages, each page comprising a sequence of addresses and wherein the cache coherency instruction specifies a page in main memory for which the operation is to be executed, the operation being executed for each of the sequence of addresses in the specified page.

8. A cache coherency mechanism according to claim 7, wherein the cache is partitioned into a plurality of cache partitions, and wherein each page comprises a number of addresses, said number of addresses being at least as great as the number of locations in one of said cache partitions.

9. A cache coherency mechanism according to claim 6, wherein each cache partition is direct mapped.

10. A cache coherency mechanism according to claim 1, wherein the operation to be executed on the contents of said location in the cache is selected from a flush operation, a purge operation and a cohere operation.

11. A cache coherency mechanism according to claim 2, wherein the cache coherency instruction is a purge instruction which clears the contents of said location in the cache.

12. A computer system, comprising:
    a processor for running a process by executing a sequence of instructions;
    a main memory which holds said instructions and data for said instructions; and
    a cache connected in a memory access path between the processor and the main memory and having a plurality of storage locations, wherein a plurality of addresses in main memory have access to each storage location;

wherein the sequence of instructions for execution by the processor includes a software cache coherency instruction which includes (i) a cache coherency operation to be executed on the contents of a storage location in the cache, and (ii) an address in the main memory; and wherein the cache coherency operation is executed for the contents of said storage location in the cache to which said address in main memory has access provided that the running process normally has access to said address in main memory and independent of whether the contents of said address in main memory are held at said storage location in the cache.

13. A computer system according to claim 12, wherein the processor has a user mode of operation and a privileged mode of pereation and wherein the cache coherency instruction is executed in the user mode.

14. A computer system according to claim 12, wherein the operation to be executed on the contents of said location in the cache is selected from a flush opereation, a purge operation and cohere operation.

15. An instruction set for a computer system which includes a software cache coherency instruction which includes (i) a cache coherency operation to be executed on the contents of a location in a cache and (ii) an address in main memory;

wherein the cache coherency instruction causes the cache coherency operation to be executed for the contents of said location in the cache to which said address in main memory has access only when the running process normally has access to said address in main memory and independent of whether the contents of said address in main memory are held at said location in the cache.

16. An instruction set according to claim 15, wherein the operation to be executed on the contents of said location in the cache is selected from a flush operation, a purge operation and a cohere operation.

17. A computer system comprising:

a processor for running a process by executing a sequence of instructions;

a main memory which holds said instructions and data for said instructions; and a cache connected in a memory access path between the processor and the main memory and having a plurality of storage locations, wherein a plurality of addresses in main memory have access to each storage location;

wherein the sequence of instructions for execution by the processor includes a software cache coherency instruction which includes (i) a cache coherency operation to be executed on the contents of a storage location in the cache, and (ii) an address in the main memory;

wherein the cache coherency operation is executed for the contents of said storage location in the cache to which said address in main memory has access provided that the running process normally has access to said address in main memory and independent of whether the contents of said address in main memory are held at said storage location in the cache; and wherein the processor has a user mode of operation and a privileged mode of operation and wherein the cache coherency instruction is executed in the user mode and not the privileged mode.

18. A cumputer system according to claim 17, wherein the operation to be executed on the contents of said location in the cache is selected from a flush operation, a purge operation and a cohere operation.

19. A method of modifying the coherency status of the contents of a cache with respect to items held in a main memory, wherein a plurality of addresses in main memory have access to each location of the cache, the method comprising:

executing a software cache coherency instruction which includes (i) a cache coherency operation to be executed on the contents of a location in the cache and (ii) an address in main memory; and responsive to said cache coherency instruction, executing the cache coherency operation for the contents of said location in the cache to which said address in main memory has access when the running process normally has access to said address in main memory and independent of whether the contents of said address in main memory are held at said location in the cache.

20. A method according to claim 19, wherein the operation to be executed on the contents of said location in the cache is selected from a flush operation, a purge operation and a cohere operation.

* * * * *

UNITED STATES PATENT AND TRADEMARK OFFICE
CERTIFICATE OF CORRECTION

PATENT NO.        : 6,546,467 B2
APPLICATION NO. : 09/033134
DATED             : April 8, 2003
INVENTOR(S)       : Glenn Farrall et al.

It is certified that error appears in the above-identified patent and that said Letters Patent is hereby corrected as shown below:

Column 13, line 15, "pereation" should be --operation--

Column 13, line 19, "opereation" should be --operation--

Column 14, line 19, "cumputer" should be --computer--

Signed and Sealed this

Ninth Day of February, 2010

David J. Kappos
*Director of the United States Patent and Trademark Office*